United States Patent [19]

Conlee et al.

[11] Patent Number: 5,630,614
[45] Date of Patent: May 20, 1997

[54] BIAS APPARATUS FOR AIR BAG MODULE

[75] Inventors: James K. Conlee, Dayton; Paul K. Egelston, Franklin, both of Ohio

[73] Assignee: General Motors Corporation, Detroit, Mich.

[21] Appl. No.: 558,112

[22] Filed: Nov. 13, 1995

[51] Int. Cl.$^6$ .................................................. B60R 21/22
[52] U.S. Cl. .................. 280/730.1; 280/731; 280/732
[58] Field of Search .......................... 280/728.2, 730.1, 280/732, 731, 728.1, 743.1, 728.3

[56] References Cited

U.S. PATENT DOCUMENTS

| | | | |
|---|---|---|---|
| 3,778,085 | 12/1973 | Lipkin | 280/732 |
| 4,332,398 | 6/1982 | Smith | 280/732 |
| 4,449,728 | 5/1984 | Pilatzki | 280/731 |
| 4,842,300 | 6/1989 | Ziomek et al. | 280/732 |
| 5,135,255 | 8/1992 | Henseler et al. | 280/731 |
| 5,160,164 | 11/1992 | Fischer et al. | 280/732 |
| 5,242,192 | 9/1993 | Prescaro et al. | 280/730.1 |
| 5,306,039 | 4/1994 | Nakayama | 280/728.2 |
| 5,348,343 | 9/1994 | Hawthorn | 280/730.1 |
| 5,351,987 | 10/1994 | Donegan et al. | 280/728.2 |
| 5,364,124 | 11/1994 | Donegan et al. | 280/730.1 |

FOREIGN PATENT DOCUMENTS

| | | | |
|---|---|---|---|
| 4010767A1 | 10/1991 | Germany . | |
| 2-158444A | 6/1990 | Japan | 280/728.2 |
| 5004558 | 1/1993 | Japan . | |

OTHER PUBLICATIONS

U.S. Application No. 08/519,053, filed Aug. 24, 1995.

*Primary Examiner*—Brian L. Johnson
*Assistant Examiner*—Peter C. English
*Attorney, Agent, or Firm*—Kathryn A. Marra

[57] ABSTRACT

An air bag module includes an air bag and an inflator for generating gas to inflate the air bag. The module further includes a bias apparatus including first and second bias flaps being separate and independent from each other. The bias flaps cooperatively define an overlapped portion located atop the air bag prior to inflation such that the inflating air bag is biased when the overlapped portion is restricted and the inflating air bag is unrestrained when the overlapped portion is unrestricted. Preferably, the first and second flaps each have a fixed edge attached to the vehicle and each have a free edge opposite the fixed edge. The free edges of the first and second bias flaps overlap each other to define the overlapped portion.

20 Claims, 9 Drawing Sheets

AREA OF RESTRICTION

AREA OF RESTRICTION

BIAS APPARATUS FOR AIR BAG MODULE

This invention relates to a vehicle air bag module, and more particularly to an apparatus for biasing the direction of an inflating air bag.

BACKGROUND OF THE INVENTION

It is well known in motor vehicles to provide an air bag module which is mounted beneath an opening in the instrument panel. The air bag module typically includes a canister having a canister opening and enclosing an inflator for generating gas to inflate an air bag for deployment out through the opening in the instrument panel.

The prior art has recognized that deployment of the air bag may be directed by a bias apparatus such as a chute folded atop the air bag in the module. The chute is constructed as a single unit having three or four connected side walls such that the air bag deploys through a passageway that continually guides the deploying air bag. Some chutes, such as those with three side walls, are designed to laterally bias the air bag when occupant interaction occurs with the chute. These chutes have the shortcoming of being relatively complex to construct and to assemble to the air bag module. In addition, these chutes have relatively long side walls to guide the deploying air bag and the side walls must be folded in the air bag module which takes up space in the module.

It is also known in the prior art to provide a single unfolded flap of material between the air bag and the cover door in the instrument panel through which the air bag deploys. The flap prevents direct contact of the air bag with the underside of the cover door during air bag deployment and also while the air bag is folded and stored under the cover door. However, such a flap does not direct, guide, or bias the air bag during deployment.

SUMMARY OF THE INVENTION

The present invention provides an improved bias apparatus which biases the air bag when the bias apparatus is restricted or blocked, such as by a vehicle occupant. Advantageously, when the bias apparatus is not restricted, the bias apparatus immediately opens out of the way to allow unrestrained and unguided deployment of the air bag. Also advantageously, the bias apparatus is relatively easy to make and assemble and the bias apparatus does not need to be folded so that it takes up less space in the module. Advantageously, the bias apparatus also protects the air bag from interaction with a cover door on the instrument panel before and during deployment. The bias apparatus also advantageously can be designed such that the air bag is biased toward a predetermined lateral direction so that the occupant is biased in an opposite lateral direction.

These advantages are accomplished in the present invention by providing an air bag module in a vehicle. The module includes an air bag and an inflator for generating gas to inflate the air bag. The module further includes a bias apparatus including first and second bias flaps being separate and independent from each other. The bias flaps cooperatively define an overlapped portion located atop the air bag prior to inflation such that the inflating air bag is biased when the overlapped portion is restricted and the inflating air bag is unrestrained when the overlapped portion is unrestricted. Preferably, the first and second flaps each have a fixed edge attached to the vehicle and each have a free edge opposite the fixed edge. The free edges of the first and second bias flaps overlap each other to define the overlapped portion. Advantageously, the first and second bias flaps are preferably each in an unfolded, generally flat condition prior to air bag inflation so that the bias apparatus is easy to package in the module.

In a preferred form, the bias apparatus has a laterally inboard side and a laterally outboard side and the overlapped portion is greater on the laterally outboard side than on the laterally inboard side such that the air bag is biased toward the laterally inboard side. Alternately, the overlapped portion is greater on the laterally inboard side than on the laterally outboard side such that the air bag is biased toward the laterally outboard side. Also alternately, the overlapped portion may be generally equivalent across a lateral length of the bias apparatus such that when the overlapped portion has a restricted area upon initial air bag inflation the air bag is biased away from the restricted area of the overlapped portion.

BRIEF DESCRIPTION OF THE DRAWINGS

Embodiments of the present invention are described, by way of example only, with reference to the accompanying drawings in which.

DESCRIPTION OF THE PREFERRED EMBODIMENT

Figure 1A:
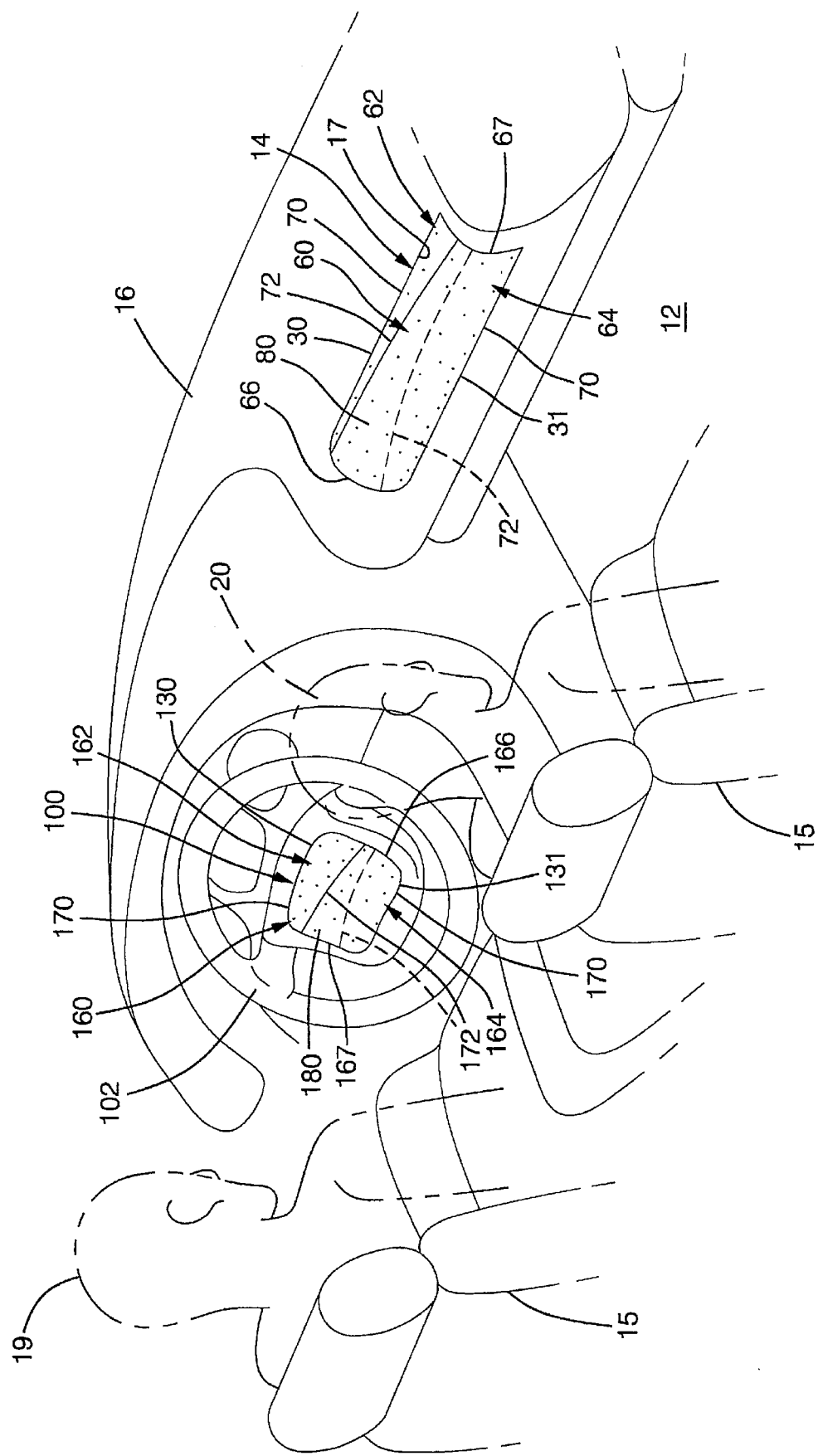
FIG. 1A is a perspective view of a vehicle interior showing driver's side and passenger side occupants in the normal seating position and showing a passenger side module according to the present invention and a driver's side module according to an alternate embodiment of the present invention, both with the air bags in an uninflated condition.
Figure 1B:
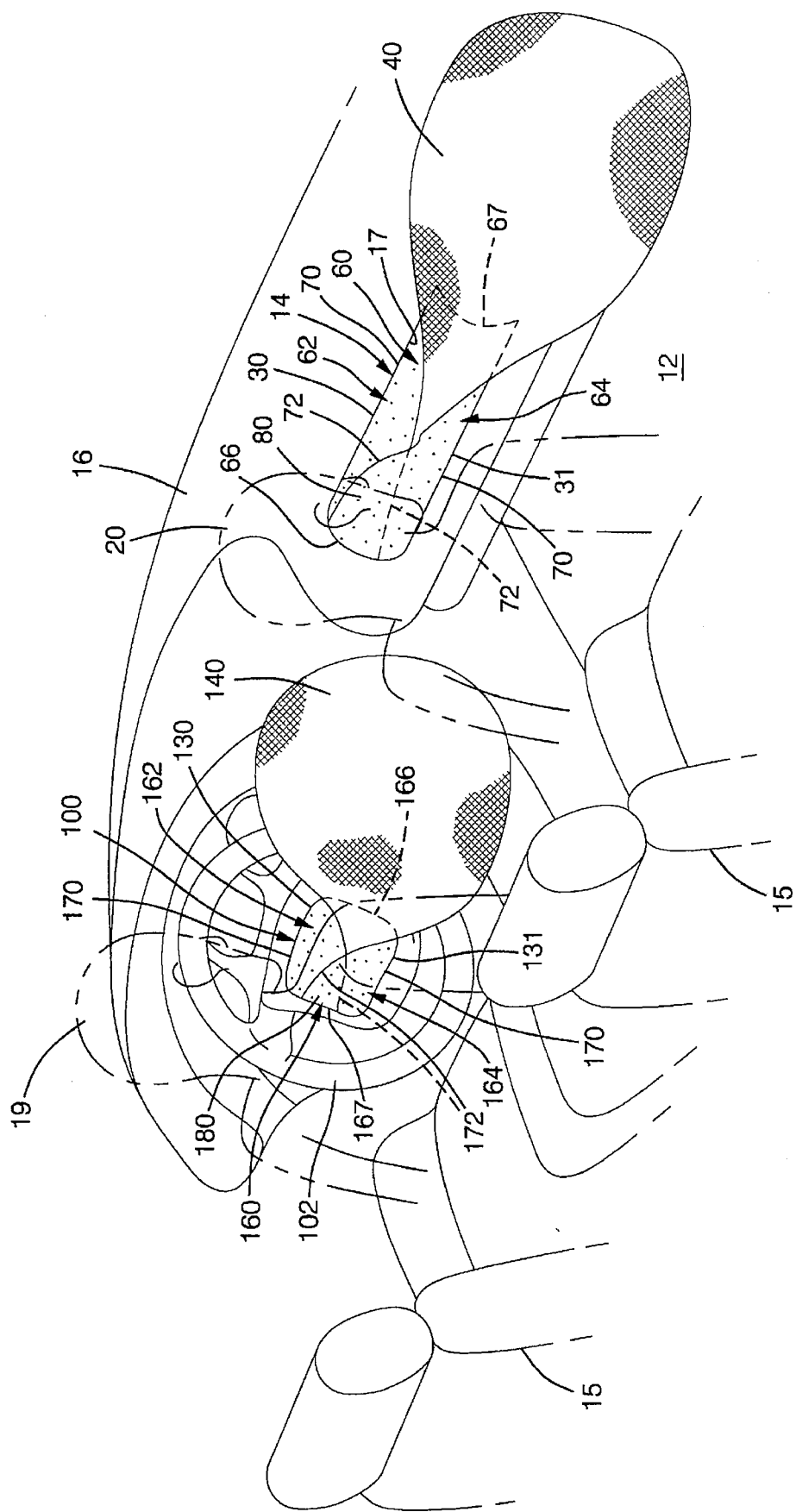
FIG. 1B is a view similar to FIG. 1A, but showing the occupants out of the normal seating position and showing the inflated air bags in a biased condition.

Referring to FIGS. 1A and 1B, a vehicle interior 12 includes a passenger side air bag module 14 mounted beneath an instrument panel 16 and a driver's side air bag module 100 according to an alternate embodiment that is mounted on a vehicle steering wheel 102. The driver's side module 100 and passenger side module 14 are each normally covered by a cover door, indicated at 18 for the passenger side module 14 in FIGS. 3–5. However, for clarity of the invention, the cover doors are not shown in the remainder of the Figures. The vehicle interior 12 further includes seats 15 in which driver's side and passenger side occupants 19, 20 are normally seated as shown in FIG. 1A. The preferred embodiment for the passenger side module 14 will now be described in detail.

Figure 3:
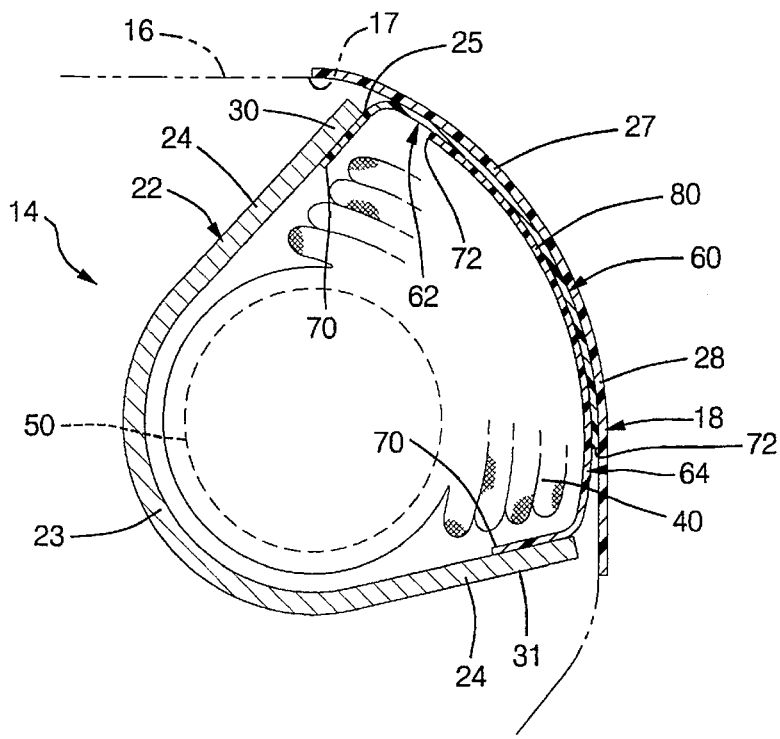
FIG. 3 is a sectional view of the passenger side module showing the bias apparatus in the closed condition and the air bag in the uninflated condition and showing the bias apparatus attached to a canister of the passenger side module.
Figure 4:
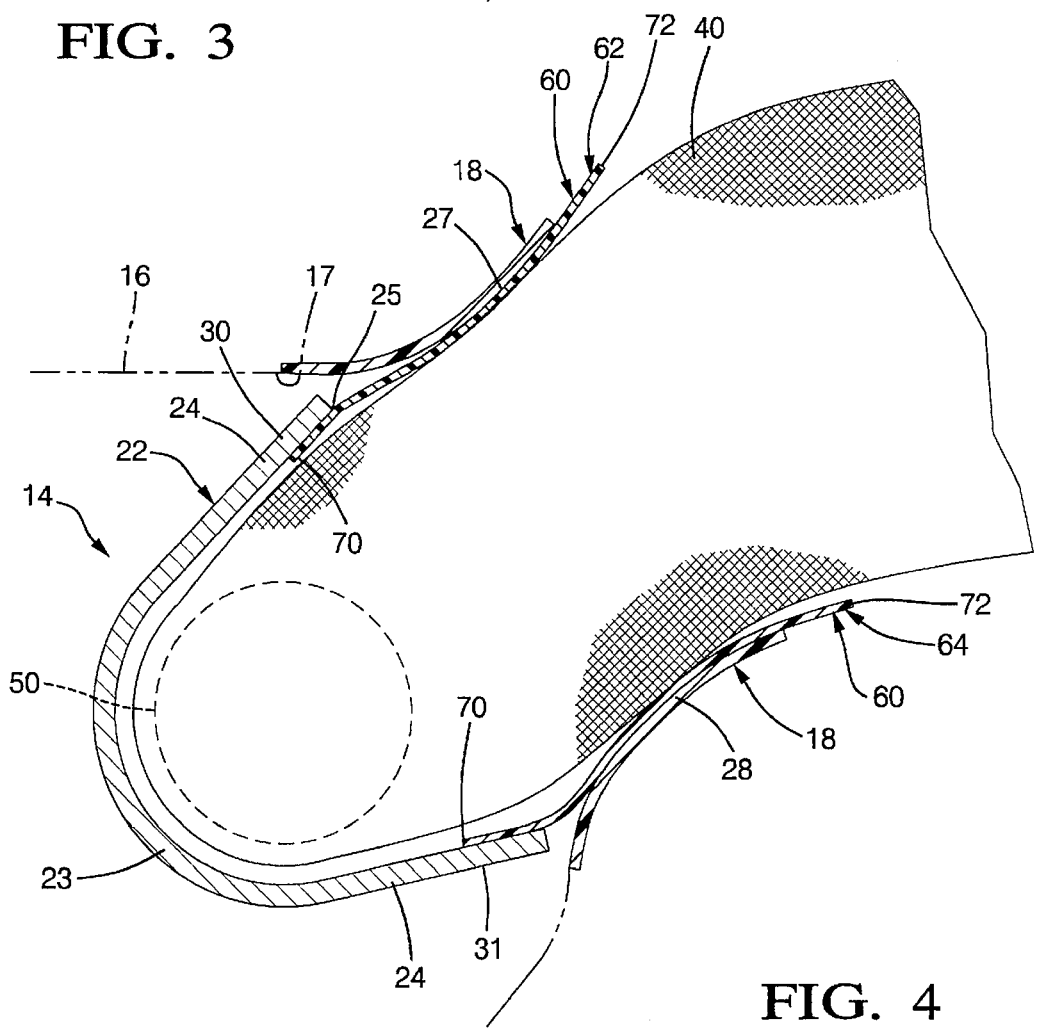
FIG. 4 is a view similar to FIG. 3, but showing the bias apparatus in the unrestricted, open condition and showing the inflated air bag in the unrestrained condition.
Figure 5:
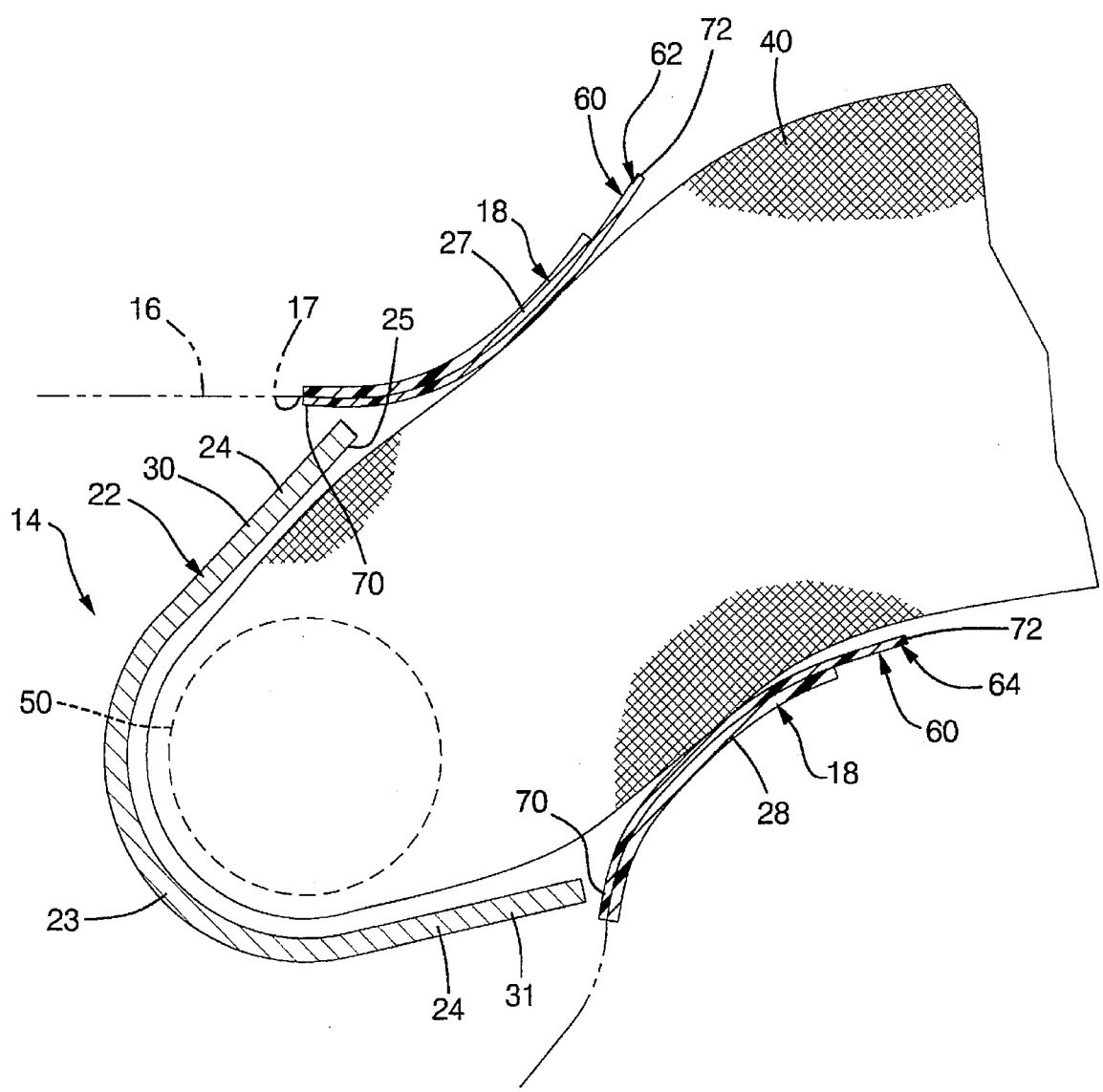
FIG. 5 is a view similar to FIG. 4, but showing the bias apparatus attached to a cover door covering the passenger side module.

As best shown in FIGS. 4 and 5, the passenger side module 14 includes a canister 22, being made of a metallic or other suitable material, and having a curved bottom wall 23 and upstanding side walls 24 cooperatively defining a canister opening 25. The passenger side module 14 further includes an air bag 40, an inflator 50 for generating gas to inflate the air bag 40, and a bias apparatus 60 for biasing the air bag 40 under certain conditions. The passenger side module 14 is located beneath an instrument panel opening 17 normally closed by the cover door 18. The cover door 18 preferably includes weakened portions (not shown) so that the inflating air bag 40 forces open the cover door 18 during deployment. The cover door 18 is shown in FIGS. 3–5 as having an upper section 27 and a lower section 28. However, it will be appreciated that the bias apparatus 60 may be used in conjunction with any cover door design having any tear pattern.

The generally cylindrical inflator 50 is mounted within the canister 22. The inflator 50 may be of any conventional construction for generating gas to inflate the air bag 40 upon sensing certain predetermined vehicle conditions. The air bag 40 is formed of a suitable fabric material and is normally stored within the canister 22 in a folded condition atop the inflator 50. The air bag 40 is suitably attached to the canister 22 or inflator 50, as shown, in any typical manner to anchor the air bag 40 during deployment.

The bias apparatus 60 includes a first bias flap 62 and a second bias flap 64. The first and second bias flaps 62, 64 are formed completely independent and separate from each other. The bias flaps 62, 64 are preferably each made of a flat sheet of fabric or other flexible material. The bias apparatus 60 has a laterally inboard side 66 toward the center of the vehicle interior 12 and an opposite laterally outboard side 67. The first bias flap 62 extends from an upper side 30 of the passenger side module 14 and the second bias flap 64 extends from a lower side 31 of the passenger side module 14. The bias flaps 62, 64 each have a fixed edge 70 attached to the vehicle and each have a free edge 72 opposite the fixed edge 70. The fixed edges 70 of the bias flaps 62, 64 are suitably attached to either the canister 22 as shown in FIGS. 3 and 4 or to the cover door 18 as shown in FIG. 5. The bias flaps 62, 64 are generally located above and overlying the air bag 40, but beneath the cover door 18. Thus, besides biasing the air bag 40, the bias flaps 62, 64 also serve the dual function of preventing contact between the air bag 40 and the cover door 18 prior to and during air bag inflation.

Figure 2A:
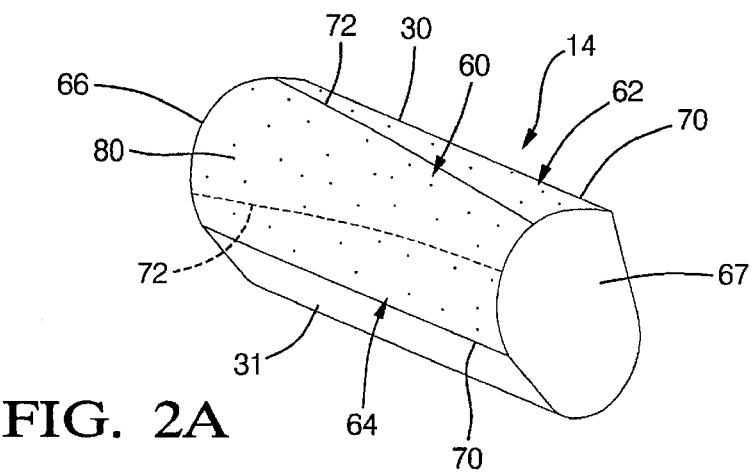
FIG. 2A is a schematic perspective view of the passenger side module with a bias apparatus in a closed condition prior to air bag inflation.

As best shown in FIG. 2A, the bias flaps 62, 64 cooperatively define an overlapped portion 80 located atop the air bag 40 prior to inflation such that the inflating air bag 40 is laterally biased when the overlapped portion 80 is restricted and the inflating air bag 40 is unrestrained when the overlapped portion 80 is unrestricted, as will be described in more detail hereinafter. More specifically, the free edges 72 of the bias flaps 62, 64 overlap each other to define the overlapped portion 80 which preferably extends laterally across an entire lateral length of the bias apparatus 60. As shown in FIG. 2A, the bias apparatus 60 is in a closed condition and the air bag 40 is in an uninflated condition. The free edges 72 of the bias flaps 62, 64 are each straight, but cut at an angle to form a diagonal edge. Thus, the overlapped portion 80 is greater on the inboard side 66 than on the outboard side 67 to preferably bias the inflating air bag toward the outboard side 67 and bias the passenger side occupant 20 toward the inboard side 66, as best shown in FIG. 1B and described below. Preferably the overlapped portion 80 is about two inches wide on the inboard side 66 and about one inch wide on the outboard side 67. Thus, the overlapped portion 80 has a generally trapezoidal shape prior to air bag inflation. It will be appreciated that in the closed condition, the bias flaps 62, 64 are each preferably unfolded and generally flat and extended atop the air bag 40. Thus, the bias apparatus 60 advantageously does not need to be folded so that it takes up relatively little space in the passenger side module 14.

Figure 2B:
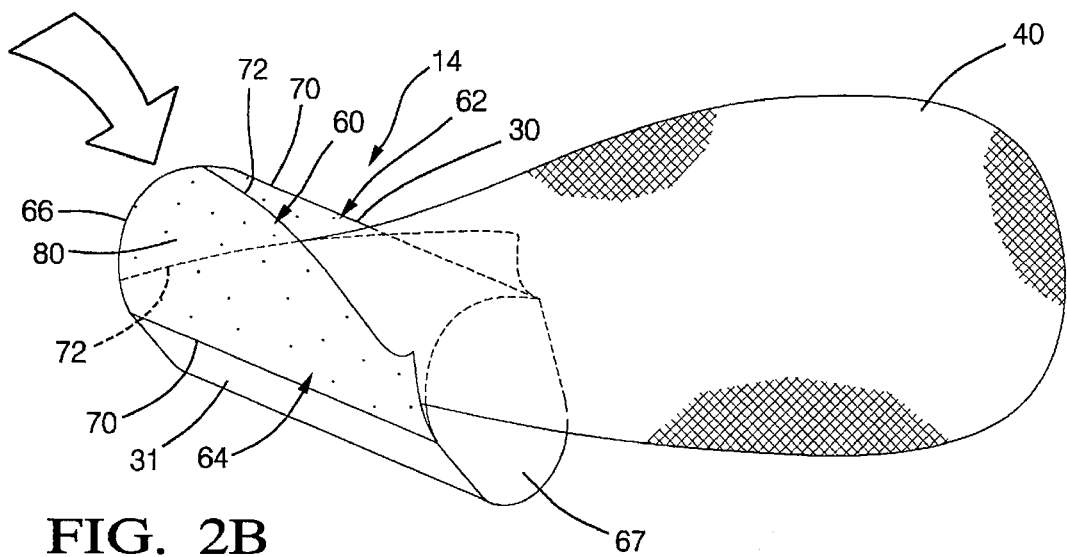
FIG. 2B is a view similar to FIG. 2A, but showing the bias apparatus in a partially open, restricted condition and the inflated air bag in the biased condition.
Figure 2C:
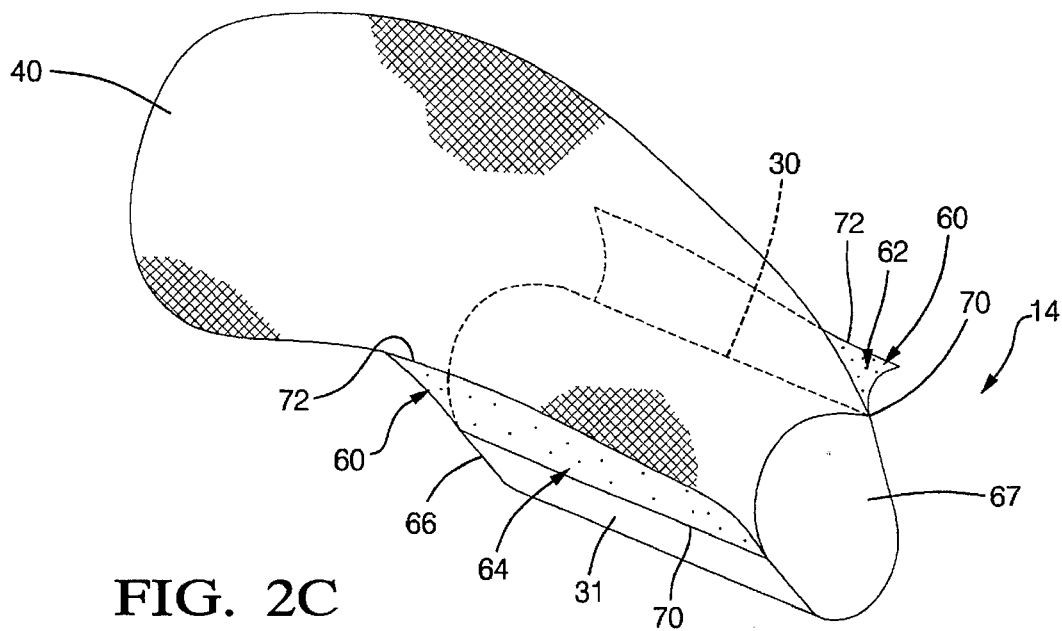
FIG. 2C is a view similar to FIG. 2A, but showing the bias apparatus in an unrestricted, open condition and the inflated air bag in an unrestrained condition.

Upon generation of gas by the inflator 50, the air bag 40 begins to inflate. As shown in FIGS. 1B and 2B, when the passenger side occupant 20 is out of position, the bias apparatus 60 provides an area of greater resistance on the inboard side 66 than on the outboard side 67 due to the greater overlap on the inboard side 66. Thus, the air bag 40 will travel the path of least resistance and be biased toward the outboard side 67 and the passenger side occupant 20 will be biased toward the inboard side 66 to form the area of restriction. FIG. 2B shows the bias apparatus 60 in a partially open, restricted condition with the inflating air bag 40 being biased toward the outboard side 67. When the passenger side occupant 20 is in the normal seating position and the bias apparatus 60 is unrestricted as shown in FIG. 2C, the bias apparatus 60 opens completely out of the way and the inflating air bag 40 deploys in a normal unrestrained manner without being guided or directed by the unconnected, separate bias flaps 62, 64. It will further be appreciated that the bias flaps 62, 64 provide a protective layer between the cover door 18 and the deploying air bag 40 whether the bias apparatus 60 is restricted or unrestricted during air bag deployment.

It will be understood that a person skilled in the art may make modifications to the preferred embodiment shown herein within the scope and intent of the claims. Although the preferred embodiment shows the overlapped portion 80 having a generally trapezoidal shape and a greater overlapped portion on the inboard side 66 than the outboard side 67, it will be appreciated that many variations of the size and shape of the overlapped portion 80 are possible. The greater the overlapped portion 80, the greater the resistance when the bias apparatus 60 is restricted. Thus, the overlapped portion 80 could also be designed to be equivalent across the lateral length of the bias apparatus 60 such that there is equal resistance across the entire overlapped portion 80 and the air bag 40 will naturally be biased away from the restricted area which is blocked, such as by the passenger side occupant 20. It will also be appreciated that the lateral bias direction of the air bag 40 can be predetermined by the amount of inboard versus outboard overlap on the overlapped portion 80. It will further be appreciated that although the free edges 72 are shown as diagonal, many other shapes are possible.

Figure 6A:
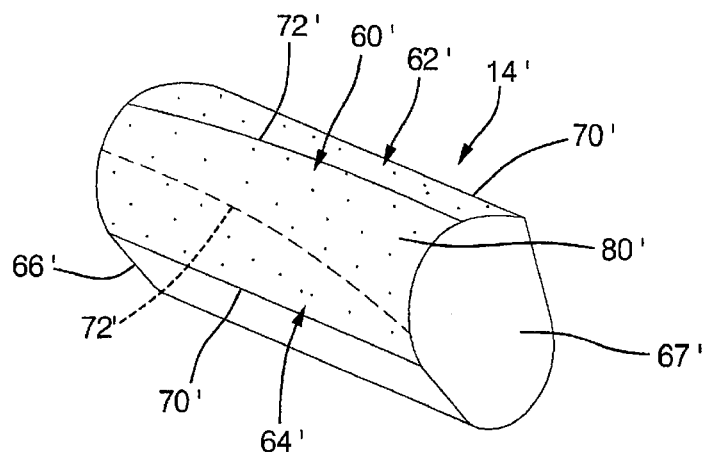
FIG. 6A is a perspective view of the passenger side module similar to FIG. 2A, but showing an alternate embodiment of the bias apparatus with the bias apparatus in the closed condition and the air bag in the uninflated condition.
Figure 6B:
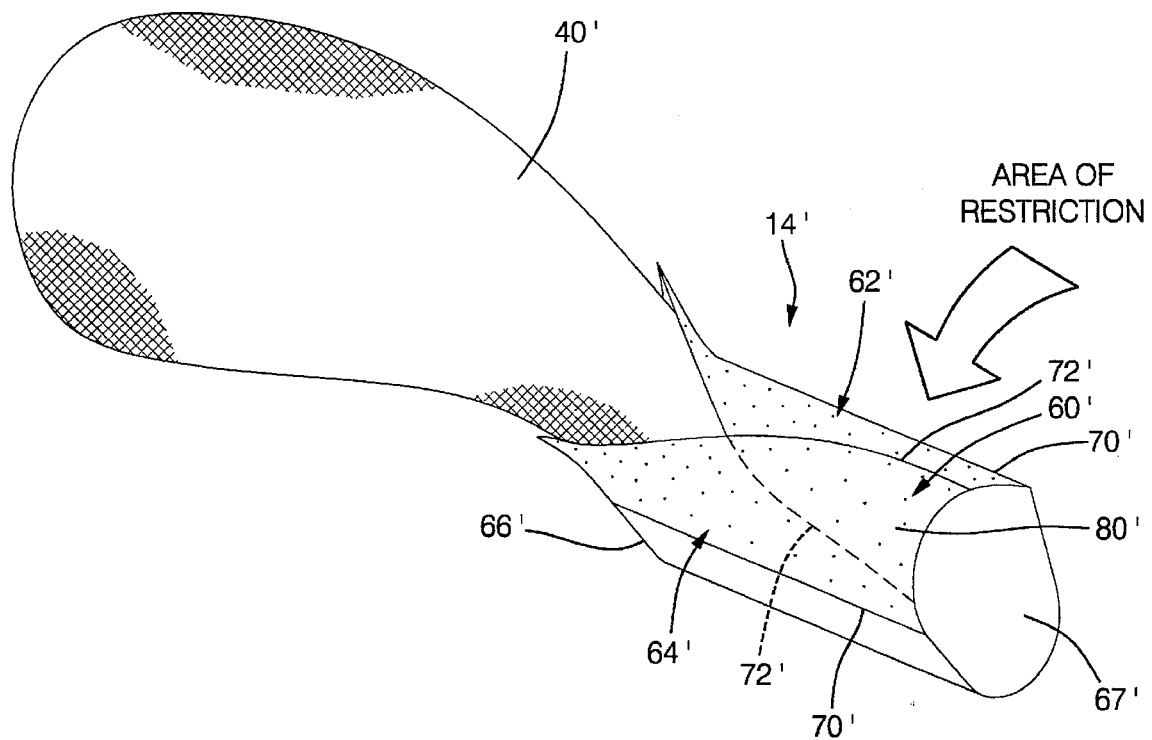
FIG. 6B is a view similar to FIG. 6A, but showing the bias apparatus in the partially open, restricted condition and showing the inflated air bag in the biased condition.

As another example, FIGS. 6A and 6B show an alternate embodiment of the bias apparatus 60' on a passenger side module 14'. The bias apparatus 60' has first and second bias flaps 62', 64' with fixed edges 70' suitably attached to the vehicle and with free edges 72' defining an overlapped portion 80'. FIG. 6A shows the bias apparatus 60' in the closed condition prior to air bag inflation. The overlapped portion 80' is greater on a laterally outboard side 67' than on a laterally inboard side 66'. Upon the generation of inflator gas, an air bag 40' begins to inflate. As shown in FIG. 6B, the restricted bias apparatus 60' provides an area of greater resistance on the outboard side 67' than on the inboard side 66' due to the greater overlap on the outboard side 67'. Thus, the air bag 40' will travel the path of least resistance and be biased toward the inboard side 66' and a passenger side occupant will be biased toward the outboard side 67' to form the area of restriction shown in FIG. 6B. FIG. 6B shows the bias apparatus 60' in a partially open, restricted condition with the inflating air bag 40' being biased toward the inboard side 66'. When the passenger side occupant is in the normal seating position and the bias apparatus 60' is unrestricted (not shown), the air bag 40' deploys in a normal unrestrained manner similar to that shown in FIG. 2C.

Figure 7A:
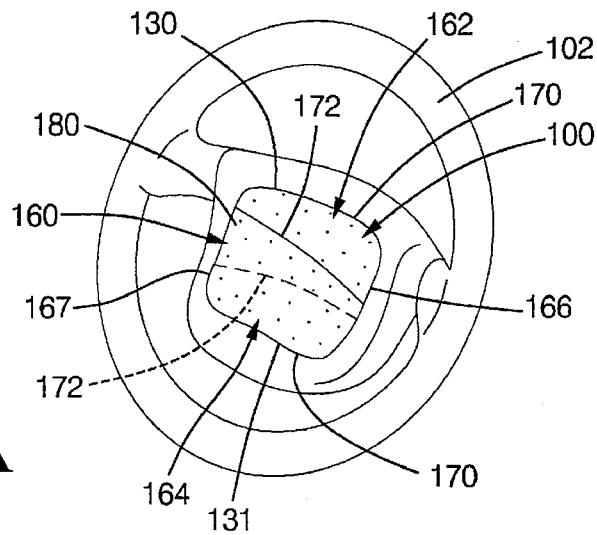
FIG. 7A is a perspective view of a driver's side module showing the alternate embodiment from FIGS. 1A and 1B and showing the bias apparatus in the closed condition and the air bag in the uninflated condition.
Figure 7B:
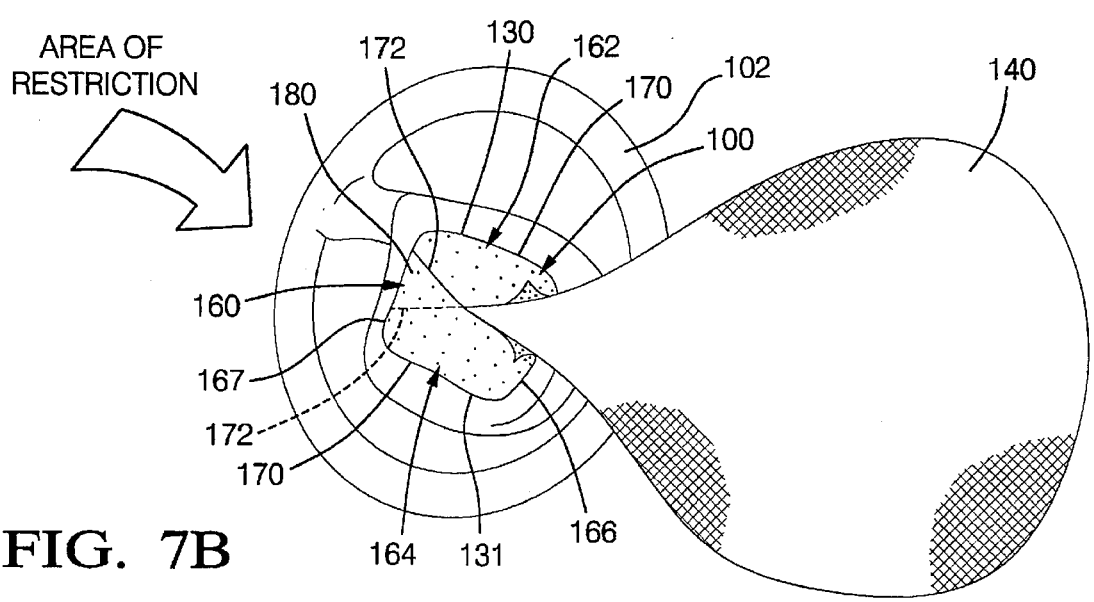
FIG. 7B is a view similar to FIG. 7A, but showing the bias apparatus in the partially open, restricted condition and showing the inflated air bag in the biased condition.
Figure 7C:
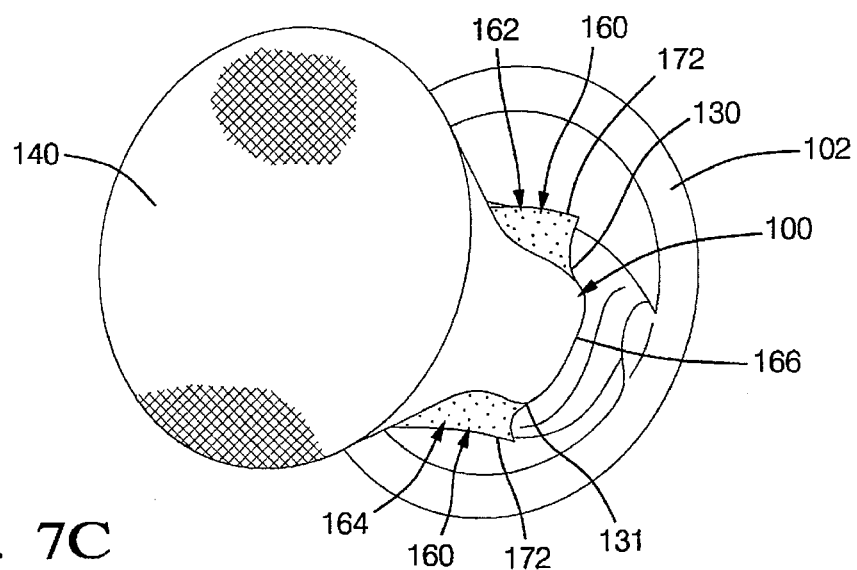
FIG. 7C is a view similar to FIG. 7A, but showing the bias apparatus in the unrestricted, open condition and showing the inflated air bag in the unrestrained condition.

FIGS. 7A–7C show an alternate embodiment of the invention for use with a driver's side air bag module 100 which is also shown in FIGS. 1A and 1B. The driver's side module 100 is mounted on a hub portion of the steering wheel 102 and includes an inflator (not shown) and an air bag 140 normally stored in a folded condition atop the inflator. The driver's side module 100 further includes a bias apparatus 160 for biasing the air bag 140 when restricted by the driver's side occupant 19. It will be appreciated that the bias apparatus 160 is normally covered by a cover door (not shown) attached to the driver's side module 100. The bias apparatus 160 overlies the air bag 140 to provide a protective layer between the air bag 140 and cover door prior to and during air bag inflation.

The bias apparatus 160 includes a first bias flap 162 and a second bias flap 164. The bias flaps 162, 164 are formed completely independent and separate from each other. The bias flaps 162, 164 are preferably each made of a flat sheet of fabric or other flexible material. The bias apparatus 160 has a laterally inboard side 166 toward the center of the vehicle interior 12 and an opposite laterally outboard side 167. The first bias flap 162 extends from an upper side 130 of the driver's side module 100 and the second bias flap 164 extends from a lower side 131 of the driver's side module 100. The bias flaps 162, 164 each have a fixed edge 170 suitably attached to either the driver's side module 100 or cover door such as by tape or fasteners (not shown). Each of the bias flaps 162, 164 also has a free edge 172 opposite the fixed edge 170.

As best shown in FIG. 7A, the bias flaps 162, 164 cooperatively define an overlapped portion 180 located atop the air bag 140 prior to inflation such that the inflating air bag 140 is laterally biased when the overlapped portion 180 is restricted and the inflating air bag 140 is unrestrained when the overlapped portion 180 is unrestricted. More specifically, the free edges 172 of the bias flaps 162, 164 overlap each other to define the overlapped portion 180 which extends laterally across an entire lateral length of the bias apparatus 160. As shown in FIG. 7A, the bias apparatus 160 is in a closed condition and the air bag 140 is in an uninflated condition. The free edges 172 of the bias flaps 162, 164 are each straight, but cut at an angle to form a diagonal edge. Thus, the overlapped portion 180 is greater on the outboard side 167 than on the inboard side 166 to preferably bias the inflating air bag 140 toward the inboard side 166 and bias the driver's side occupant 19 toward the outboard side 167, as described below. The overlapped portion 180 has a generally trapezoidal shape prior to air bag inflation. It will be appreciated that in the closed condition, the bias flaps 162, 164 are each preferably unfolded and generally flat and extended atop the air bag 140. Thus, the bias apparatus 160 advantageously does not need to be folded so that it takes up relatively little space in the driver's side module 100.

Upon generation of gas by the inflator, the air bag 140 begins to inflate. As shown in FIGS. 1B and 7B, when the driver's side occupant 19 is out of position, the bias apparatus 160 provides an area of greater resistance on the outboard side 167 than on the inboard side 166 due to the greater overlap on the outboard side 167. Thus, the air bag 140 will travel the path of least resistance and be biased toward the inboard side 166 and the driver's side occupant 19 will be biased toward the outboard side 167 forming the area of restriction as indicated. FIG. 7B shows the bias apparatus 160 in a partially open, restricted condition with the inflating air bag 140 biased toward the inboard side 166. When the driver's side occupant 19 is in the normal seating position and the bias apparatus 160 is unrestricted as shown in FIG. 7C, the bias apparatus 160 opens completely out of the way and the inflating air bag 140 deploys in a normal unrestrained manner without being guided or directed by the unconnected, separate bias flaps 162, 164.

Although this embodiment shows the overlapped portion 180 having a generally trapezoidal shape with a greater overlap on the outboard side 167 than the inboard side 166, it will be appreciated that many variations of the size and shape of the overlapped portion 180 are possible. It will also be appreciated that the lateral bias direction of the air bag 140 can be predetermined by the amount of inboard versus outboard overlap. It will further be appreciated that although the free edges 172 are shown as diagonal, many other shapes are possible.

Figure 8A:
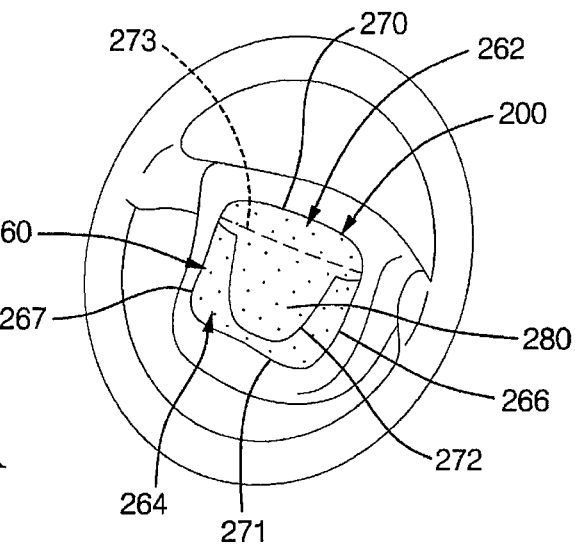
FIG. 8A is a view similar to FIG. 7A, but showing another alternate embodiment of the bias apparatus on the driver's side module with the bias apparatus in the closed condition and the air bag in the uninflated condition.
Figure 8B:
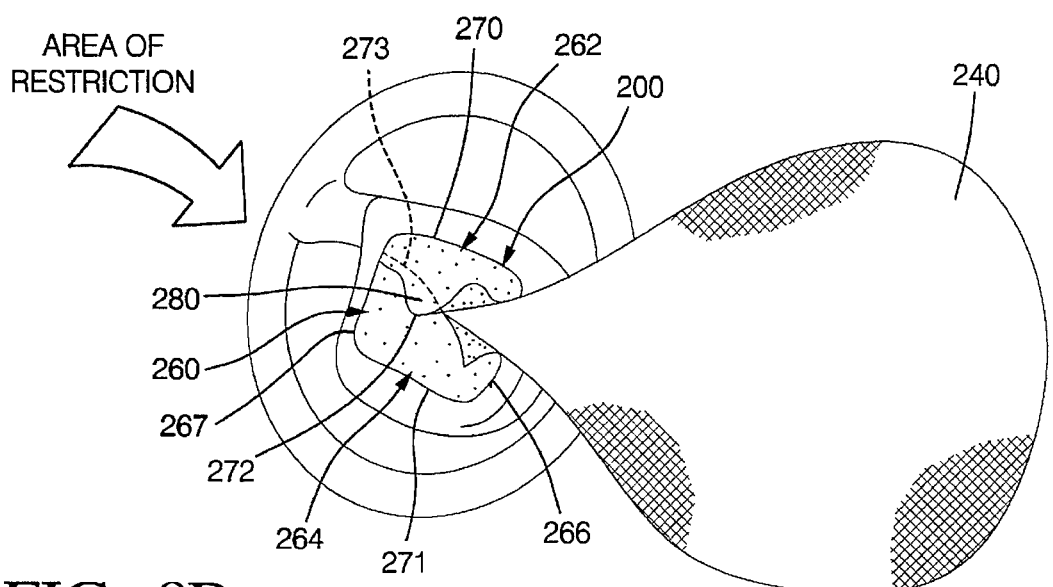
FIG. 8B is a view similar to FIG. 8A, but showing the bias apparatus in the partially open, restricted condition and showing the inflated air bag in the biased condition toward a laterally inboard side.
Figure 8C:
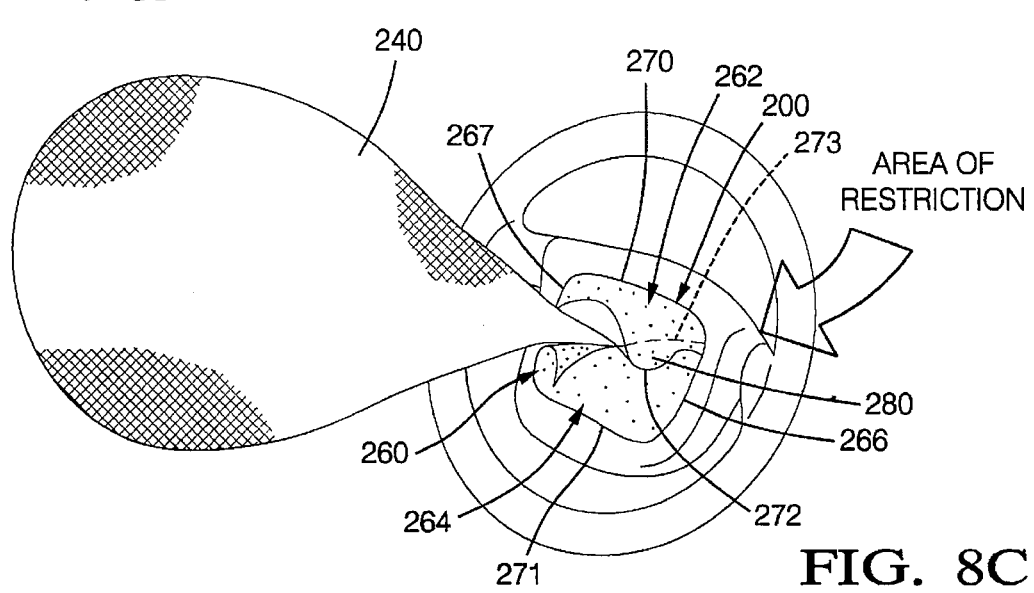
FIG. 8C is a view similar to FIG. 8A, but showing the bias apparatus in the partially open, restricted condition and showing the inflated air bag in the biased condition toward a laterally outboard side.

For example, FIGS. 8A and 8B show another embodiment of the bias apparatus 260 in a driver's side module 200. FIG. 8A shows the bias apparatus 260 in the closed condition prior to air bag inflation. The bias apparatus 260 has first and second flaps 262, 264 with fixed edges 270, 271, respectively, each suitably attached to the driver's side module 200 or an overlying cover door (not shown). The first and second bias flaps 262, 264 have free edges 272, 273, respectively, cooperatively defining an overlapped portion 280 having a generally semi-circular shape. The free edge 272 of the first bias flap 262 has a curved shape and the free edge 273 of the second bias flap 264 has a straight shape. The overlapped portion 280 is laterally symmetrical so that an even amount of resistance is naturally present on a laterally inboard side 266 and a laterally outboard side 267 of the bias apparatus 260. Upon generation of inflator gas, an air bag 240 begins to inflate. As shown in FIG. 8B, when the area of restriction is formed on the outboard side 267, such as by blockage of the cover door by a driver's side occupant, the air bag 240 will travel the path of least resistance and be biased toward the inboard side 266. FIG. 8B shows the bias apparatus 260 in a partially open, restricted condition with the area of restriction on the outboard side 267 and the air bag 240 being biased toward the inboard side 266. Alternately, if the area of restriction is on the inboard side 266 as shown in FIG. 8C, the air bag 240 will be biased toward the outboard side 267 as enabled by the symmetrical shape of the overlapped portion 280 of the bias apparatus 260. When the driver's side occupant is in the normal seating position and the bias apparatus 260 is unrestricted (not shown), the air bag 240 deploys in a normal unrestrained manner.

Figure 9A:
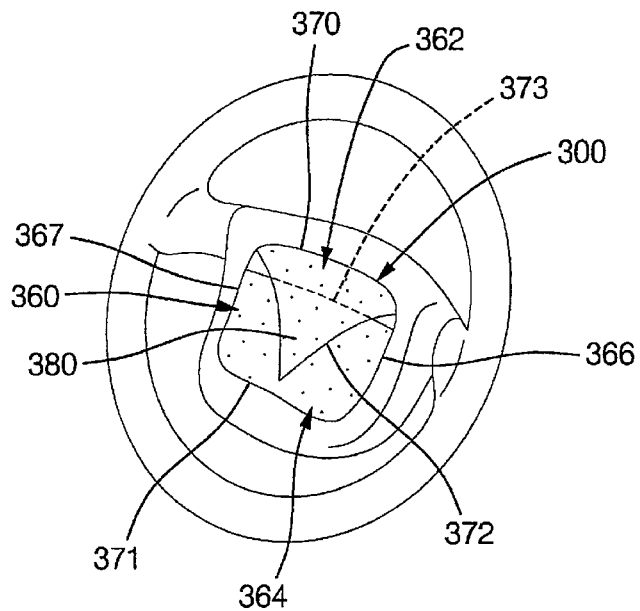
FIG. 9A is a view similar to FIG. 7A, but showing yet another alternate embodiment of the bias apparatus on the driver's side module with the bias apparatus in the closed condition and the air bag in the uninflated condition.
Figure 9B:
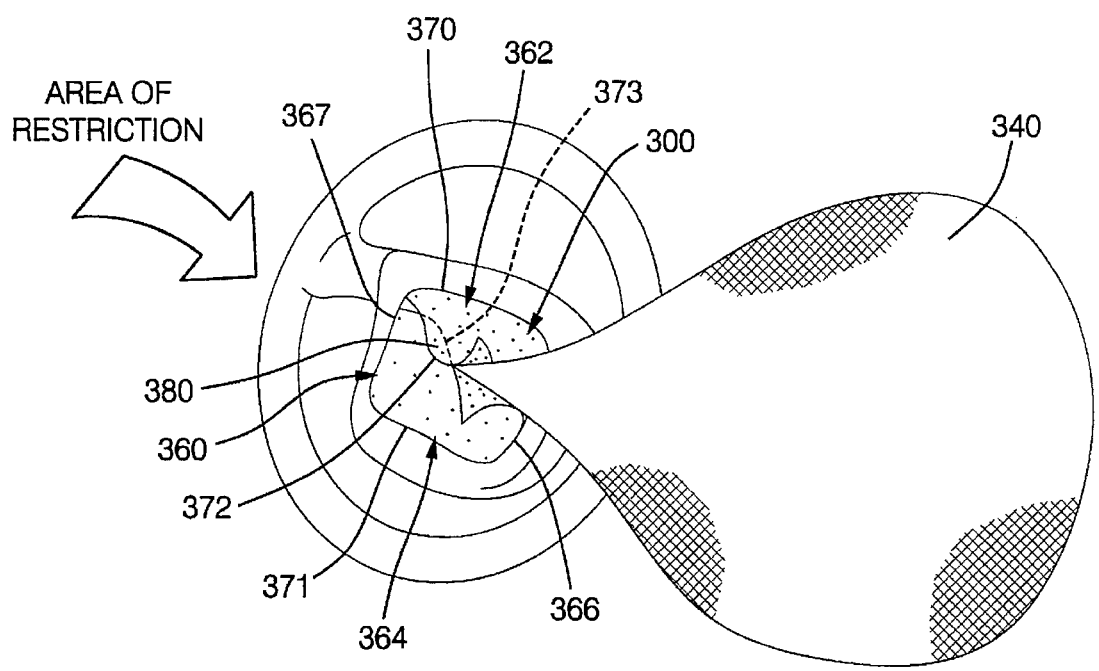
FIG. 9B is a view similar to FIG. 9A, but showing the bias apparatus in the partially open, restricted condition and showing the inflated air bag in the biased condition.

As another example, FIGS. 9A and 9B show yet another embodiment of the bias apparatus in a driver's side module 300. FIG. 9A shows the bias apparatus 360 in the closed condition prior to air bag inflation. The bias apparatus 360 has first and second bias flaps 362, 364 with fixed edges 370, 371, respectively, suitably attached to the driver's side module 300 or overlying cover door (not shown). The first and second bias flaps 362, 364 have free edges 372, 373, respectively, defining an overlapped portion 380 having a generally triangular shape. The free edge 372 of the first bias flap 362 has a tapered shape and the free edge 373 of the second bias flap 364 has a straight shape. The overlapped portion 380 is laterally symmetrical so that an even amount of resistance is naturally present on a laterally inboard side 366 and a laterally outboard side 367 of the bias apparatus 360. Upon generation of inflator gas, an air bag 340 begins to inflate. As shown in FIG. 9B, when the area of restriction is formed on the outboard side 367, such as by blockage of the cover door by a driver's side occupant, the air bag 340 will travel the path of least resistance and be biased toward the inboard side 366. FIG. 9B shows the bias apparatus 360 in a partially open, restricted condition with the area of restriction on the outboard side 367 and the air bag 340 being biased toward the inboard side 366. Alternately, it will be appreciated that if the area of restriction is on the inboard side 366, the air bag 340 will be biased toward the outboard side 367 as enabled by the symmetrical shape of the overlapped portion 380 of the bias apparatus 360. When the driver's side occupant is in the normal seating position and the bias apparatus 360 is unrestricted (not shown), the air bag 340 deploys in a normal unrestrained manner.

While the present invention has been described as carried out in specific embodiments thereof, it is not intended to be limited thereby but is intended to cover the invention broadly within the scope and spirit of the claims.

What is claimed is:

1. An air bag module in a vehicle comprising:

an air bag;

an inflator for generating gas to inflate the air bag; and a bias apparatus including first and second bias flaps being separate and independent from each other, the bias flaps cooperatively defining an overlapped portion located atop the air bag prior to inflation such that the inflating air bag is biased when the overlapped portion having a lateral length and the overlapped portion having a width that is varied and uneven along the lateral length of the overlapped portion.

2. The air bag module of claim 1 wherein the first and second flaps each have a fixed edge attached to the vehicle and each have a free edge opposite the fixed edge and wherein the free edges of the first and second bias flaps overlap each other to define the overlapped portion.

3. The air bag module of claim 2 wherein at least one of the free edges is straight.

4. The air bag module of claim 2 wherein at least one of the free edges is diagonal.

5. The air bag module of claim 2 wherein at least one of the free edges is curved.

6. The air bag module of claim 2 wherein at least one of the free edges is tapered.

7. The air bag module of claim 2 wherein the free edges each have a laterally extending length and wherein the overlapped portion extends along the entire length of the free edges.

8. The air bag module of claim 2 wherein the module further includes a canister for housing the air bag and inflator therein and wherein the fixed edges of the first and second bias flaps are each attached to the canister.

9. The air bag module of claim 2 wherein the vehicle includes a cover door covering the air bag prior to air bag inflation and wherein the fixed edges of the bias flaps are each attached to the cover door.

10. The air bag module of claim 1 wherein at least one of the bias flaps has a generally triangular shape.

11. The air bag module of claim 1 wherein at least one of the bias flaps has a generally semi-circular shape.

12. The air bag module of claim 1 wherein the bias apparatus has a laterally inboard side and a laterally outboard side and wherein the overlapped portion is greater on the laterally inboard side than the laterally outboard side such that the air bag is biased toward the laterally outboard side.

13. The air bag module of claim 1 wherein the bias apparatus has a laterally inboard side and a laterally outboard side and wherein the overlapped portion is greater on the laterally outboard side than on the laterally inboard side such that the air bag is biased toward the laterally inboard side.

14. The air bag module of claim 1 wherein the overlapped portion has a generally trapezoidal shape.

15. The air bag module of claim 1 wherein the module has an upper side and a lower side and wherein one of the bias flaps is attached to the upper side and wherein the other of the bias flaps is attached to the lower side and wherein the overlapped portion extends laterally across the module between the upper side and the lower side.

16. The air bag module of claim 1 wherein the first and second bias flaps are each in an unfolded condition prior to air bag inflation.

17. The air bag module of claim 1 wherein the first and second bias flaps are each in a generally flat, extended condition prior to air bag inflation.

18. An air bag module in a vehicle comprising:

an air bag;

an inflator for discharging gas to inflate the air bag;

a bias apparatus for biasing deployment of the air bag, the bias apparatus including first and second bias flaps being separate and independent from each other, the first and second bias flaps each having a fixed edge connected to the vehicle and each having an opposite free edge, the free edges of the first and second bias flaps overlapping each other to form an overlapped portion positioned atop the air bag prior to air bag inflation whereby the inflating air bag is biased by the bias flaps when the overlapped portion is restricted and the inflating air bag is unrestrained by the bias flaps when the overlapped portion is unrestricted, the overlapped portion having a lateral length and the overlapped portion having a width that is varied and uneven along the lateral length of the overlapped portion.

19. An air bag module in a vehicle comprising:

an air bag;

an inflator for generating gas to inflate the air bag;

a bias apparatus including first and second bias flaps being separate and independent from each other, the bias flaps cooperatively defining an overlapped portion located atop the air bag prior to inflation such that the inflating air bag is biased when the overlapped portion is restricted and the inflating air bag is unrestrained when the overlapped portion is unrestricted;

the first and second flaps each having a fixed edge attached to the vehicle and each having a free edge opposite the fixed edge and the free edges of the first and second bias flaps overlapping each other to define the overlapped portion; and the vehicle including a cover door covering the air bag prior to air bag inflation, and the fixed edges of the bias flaps each being attached to the cover door.

20. An air bag module in a vehicle comprising:

an air bag;

an inflator for generating gas to inflate the air bag; and a bias apparatus including first and second bias flaps being separate and independent from each other, the bias flaps cooperatively defining an overlapped portion located atop the air bag prior to inflation, the overlapped portion having a lateral length and the overlapped portion having a width that is varied and uneven along the lateral length of the overlapped portion.

* * * * *